(12) United States Patent
Torrezan et al.

(10) Patent No.: US 11,555,103 B2
(45) Date of Patent: Jan. 17, 2023

(54) POLYMERIC OLEFINIC COMPOSITION, LIGNIN USE AND OBJECT

(71) Applicant: Suzano S.A., Pituba (BR)

(72) Inventors: Talyta Torrezan, Jardim Campestre (BR); Henrique Finocchio, São Carlos (BR)

(73) Assignee: Suzano S.A., State Of Bahia (BR)

(*) Notice: Subject to any disclaimer, the term of this patent is extended or adjusted under 35 U.S.C. 154(b) by 0 days.

(21) Appl. No.: 16/324,372

(22) PCT Filed: Aug. 17, 2017

(86) PCT No.: PCT/BR2017/050232
§ 371 (c)(1),
(2) Date: Feb. 8, 2019

(87) PCT Pub. No.: WO2018/032079
PCT Pub. Date: Feb. 22, 2018

(65) Prior Publication Data
US 2019/0169410 A1 Jun. 6, 2019

(30) Foreign Application Priority Data
Aug. 19, 2016 (BR) .............. 10 2016 019278-1

(51) Int. Cl.
| | | |
|---|---|---|
| C08L 23/12 | (2006.01) | |
| C08L 23/06 | (2006.01) | |
| C08J 3/20 | (2006.01) | |
| C09K 15/34 | (2006.01) | |
| C08L 97/00 | (2006.01) | |

(Continued)

(52) U.S. Cl.
CPC ............... *C08L 23/12* (2013.01); *C08J 3/20* (2013.01); *C08K 3/26* (2013.01); *C08K 3/346* (2013.01); *C08L 23/06* (2013.01); *C08L 97/00* (2013.01); *C08L 97/005* (2013.01); *C09K 15/34* (2013.01);

(Continued)

(58) Field of Classification Search
None
See application file for complete search history.

(56) References Cited

U.S. PATENT DOCUMENTS

| | | | | |
|---|---|---|---|---|
| 5,196,460 A | * | 3/1993 | Asahi ................. | G10H 1/344 84/692 |
| 6,485,867 B1 | * | 11/2002 | Navarrete ............ | C08L 23/06 429/249 |

(Continued)

FOREIGN PATENT DOCUMENTS

JP 2014152260 A * 8/2014

OTHER PUBLICATIONS

O.A.T. Dias, et al, "Studies of lignin as reinforcement for plastics composites", Molecular Crystals and Liquid Cystais, 628: 1, 72-78, May 2016 (Year: 2016).*

(Continued)

*Primary Examiner* — Satya B Sastri
(74) *Attorney, Agent, or Firm* — B. Aaron Schulman, Esq.; Stites & Harbison, PLLC

(57) ABSTRACT

An olefinic polymer composition comprising at least one polyolefin, as well as a broadleaf tree lignin with pH below 7. The invention further relates to objects obtained from (Continued)

such a composition, and the use of broadleaf tree lignin with pH below 7 in the preparation of an olefinic polymer composition.

16 Claims, 16 Drawing Sheets

(51) Int. Cl.
    *C08K 3/26*     (2006.01)
    *C08K 3/34*     (2006.01)

(52) U.S. Cl.
    CPC .... *C08K 2003/265* (2013.01); *C08L 2205/03* (2013.01); *C08L 2310/00* (2013.01)

(56) References Cited

U.S. PATENT DOCUMENTS

| | | | |
|---|---|---|---|
| 10,400,106 B2* | 9/2019 | Ying | C08L 23/12 |
| 2013/0178563 A1* | 7/2013 | Balakshin | D21C 3/20 |
| | | | 524/72 |
| 2014/0171379 A1* | 6/2014 | Jansen | C08L 97/005 |
| | | | 514/22 |
| 2014/0242867 A1* | 8/2014 | Jansen | C08J 3/20 |
| | | | 568/361 |
| 2014/0346395 A1 | 11/2014 | Balakshin et al. | |
| 2015/0034109 A1* | 2/2015 | Dube | C08L 97/005 |
| | | | 131/352 |
| 2016/0002466 A1* | 1/2016 | Erdmann | B29C 48/022 |
| | | | 524/76 |

OTHER PUBLICATIONS

JP-2014152260-A, Aug. 2014, Machine Translation (Year: 2014).*
International Search Report dated Oct. 3, 2017 in International Application No. PCT/BR2017/050232.
O.A.T. Dias, et al, "Studies of lignin as reinforcement for plastics composites", Molecular Crystais and Liquid Crystais, 628: 1, 72-78, May 2016.
A. Gregorova et al, "Radical scavenging capacity of lignin and its effect on processing stabilization of virgin and recycled polypropylene", Journal of Applied Polymer Science, US, (Jan. 1, 2007), vol. 106, No. 3, doi:10.1002/app.26687, ISSN 0021-8995, pp. 1626-1631, XP055676539.
Alexy P et al, "The effect of blending lignin with polyethylene and polypropylene on physical properties", Polymer, Elsevier Science Publishers B.V, GB, (Jun. 1, 2000), vol. 41, No. 13, doi:10.1016/S0032-3861(99)00714-4, ISSN 0032-3861, pp. 4901-4908, XP004190963.

* cited by examiner

US 11,555,103 B2

POLYMERIC OLEFINIC COMPOSITION, LIGNIN USE AND OBJECT

The present invention generally refers to an olefinic polymer composition comprising at least one polyolefin, as well as lignin. The invention further relates to objects obtained from such a composition, and to the use of lignin in the preparation of olefinic polymer compositions.

BACKGROUND OF THE INVENTION

Lignin can be defined as a polyphenolic amorphous material derived from the dehydrogenative polymerization of three phenyl propanoid monomers: trans-coniferyl, trans-sinapyl and trans-p-coumaryl alcohols. As any natural matter, it presents substantial variations in composition, structure and purity, that affect its properties. Such variations depend on the botanical origin (grass, soft wood, hard wood) and the process of isolation/extraction of lignin.

Obtained mainly as a by-product of the manufacture of cellulose from wood, lignin has been known as a component in polymer formulations for some decades.

Although providing advantageous features, such as low density, low abrasiveness to equipment and availability from renewable sources, typical problems of polymer products comprising lignin are also known, such as increased stiffness to the detriment of tensile strength.

This invention aims to overcome the problems of the prior art, by way of an olefinic polymer composition that comprises a specific lignin, endowing such a composition with improved features not found up to now.

BRIEF DESCRIPTION OF THE INVENTION

In a first aspect, this invention concerns an olefinic polymer composition characterized by comprising at least one polyolefin, as well as pH below 7 broadleaf tree lignin.

According to the meaning herein used, "broadleaf tree" is the wood-producing tree commonly known as hardwood. In the text that follows, there are several mentions to eucalyptus only for ease of expression, on the understanding that it does not exclude any other broadleaf tree.

Lignin from eucalyptus is that one obtained from the pulp of eucalyptus wood. It is a known fact that eucalyptus lignin, like broadleaf tree lignin, presents approximately equitable ratio between fragments originating from trans-coniferyl and trans-sinapyl alcohols, and only a few fragments from trans-p-coumaryl alcohol.

According to the meaning employed herein, the term "pH below 7 lignin" refers to lignin that presents such a pH in a 10% aqueous solution. More details are given in the Examples section further on.

One or more polyolefins are adequate to the invention, either thermoplastic or elastomeric, linear or branched, monomeric or polymeric, of high or low density, without excluding any other kind.

Non-limiting examples of thermoplastic polyolefins are polyethylene (PE), polypropylene (PP), polymethylpentene (PMP), polybutene.

Non-limiting examples of elastomeric polyolefins are polyisobutylene (PIB), ethylene-propylene rubber (EPR) and non-conjugated ethylene-propylene-diene rubber (EPDM).

Without excluding any other alternative, particularly suitable to the invention are homopolymer thermoplastic polyolefins, like polyethylene and polypropylene.

The use of eucalyptus lignin with pH below 7, according to the invention, provides a composition with:
a. increase in the following properties:
flow index (MFI)
thermo-oxidative resistance (OIT — oxidative induction time)
heat deflection temperature (HDT)
stiffness (elasticity modulomodulus)
breaking strength
flexural strength
b. substantial maintenance (herein understood as within variations of ±10%) of the following
properties:
hardness
tensile strength measured at the outflow An advantage provided by the invention is the reprocessability of the polyolefins formulated with the specific lignin. One obtains stability of materials formulated according to the invention, even after repeated extrusion cycles, what indicates that the effect of reduced viscosity in the molten state (increase of MFI, "melt flow index") is not a consequence of polymer degradation. In this sense, the composition of the invention is said to be "of reuse", since it can also comprise polyolefin industrial waste and post-consumer polyolefin industrial debris.

In a particular embodiment of the invention, without excluding any other, the purity of lignin is advantageously equal to or greater than 85%.

In a particular embodiment of the invention, without excluding any other, the lignin used in the composition of the invention is Kraft lignin, that is, obtained by any appropriate process of isolation from the black liquor of the Kraft process, this being the sulphate process of manufacturing cellulose, known by the person skilled in the art.

Among particular embodiments, the composition of the invention may contain other polymers, as well as additives, organic/inorganic fillers and reinforcements, known by a person skilled in the art. Some not-limiting examples are cited below:

Other polymers: polyamides, polyesters, polyalkylene glycols, polyacrylates, polymethylmetacrylates, polyanilydes, vinyl copolyols, mixtures thereof, etc.;

Additives: antioxidants, anti-UV agents, lubricants, plasticizers, stabilizers, compatibilizers, impact modifiers, anti-flame agents, dyes, colorants and cross-linking agents;

Fillers and reinforcement: talc, calcium carbonate, kaolin, mica, clays, fibers (of glass, carbon, aramid, vegetables, etc.).

Particularly, and without excluding any other alternative, the lignin content in the composition of the invention, in relation to the total weight of the composition, is 5 to 50%, and more particularly between 10 and 30%.

Particularly, a high lignin content composition, above 50%, according to the invention, is also used as a concentrate (or master batch), that is, a mixture with high content lignin in polymer, optionally comprising additives, to be used in amounts that are homogenized and diluted in final polymer formulations.

In another aspect, the invention relates to objects obtained from olefinic thermoplastic polymer compositions comprising at least one polyolefin, as well as pH below 7 eucalyptus lignin, obtained by processes well-known by a person skilled in the art, particularly by injection.

In another aspect, the invention relates to the use of pH below 7 eucalyptus lignin in an olefinic polymer composition, such as those described above. Particularly, and without excluding any other alternative, the olefinic polymer composition is of reuse.

EXAMPLES

The following are exemplary embodiments of the invention, which do not impose any limitation to the extension of the invention other than what is contained in the attached claims.

In the tests that follow, the polymers mentioned therein, except otherwise informed, were the following PP (polypropylene) and PE (polyethylene):

Polypropylene (PP): homopolymer, grade H301, provided by Braskem SA.

Polyethylene (PE): homopolymer, grade HC7260LS-L, provided by Braskem SA.

BRIEF DESCRIPTION OF THE FIGURES

FIG. 1A presents flow index variation, FIG. 1B shows carbonyl variation, FIG. 1C presents GPa stiffness variation and FIG. 1D presents tensile strength variation in Mpa;

FIG. 2B shows thermo-oxidative resistance variation, FIG. 2C shows stiffness variation (elasticity modulus), FIG. 2D shows tensile strength variation, FIG. 2E shows variation of breaking strength and FIG. 2F shows flexural strength variation;

FIG. 3A shows variation of the flow index, FIG. 3B shows thermo-oxidative resistance variation, FIG. 3C shows stiffness variation (elasticity modulus) and FIG. 3D shows the tensile strength variation;

FIG. 4A shows flow index variation, FIG. 4B shows thermo-oxidative resistance variation, FIG. 4C shows stiffness variation (elasticity modulus) and FIG. 4D shows tensile strength variation;

FIGS. 4A', 4B', 4C' and 4D'—evaluation charts of composites properties comprising 30% of different types of lignin in PE, the presented values therein being relative to the properties of the pure polymer, FIG. 4A' shows flow index variation, FIG. 4B' shows thermo-oxidative resistance variation, FIG. 4C' shows stiffness variation (elasticity modulus) and FIG. 4D' shows tensile strength variation;

FIG. 5A shows flow index variation; FIG. 5B shows tensile strength variation; and FIG. 5C shows flexural strength variation;

FIGS. 5A', 5B' and 5C'— evaluation charts with properties of the composites comprising between 30% lignin A and 3% of compatibilizer in PE, in order to improve the interface properties and the visual aspect of the pieces, the presented values therein being relative to the properties of the pure polymer; the compatibilizer was Polybond® 3349, a linear low density polyethylene graphitized with maleic anhydride, provided by the company Addivant, FIG. 5A' shows flow index variation; FIG. 5B' shows tensile strength variation; and FIG. 5C' shows flexural strength variation;

FIG. 6A shows flow index variation, FIG. 6B shows thermo-oxidative resistance variation; and FIG. 6 shows elasticity modulus (stiffness) variation.

EXAMPLE 1 comparative evaluation of general properties, between the PP and PE polymers, and PP and PE composites comprising 30% lignin A (92.5% lignin, pH<7, eucalyptus Kraft lignin).

See the table below, with the variation of different properties related to the incorporation of 30% lignin in PP and PE in relation to the properties of pure polymers.

|  | PP + 30% lignin | PE + 30% lignin |
|---|---|---|
| MFI | 287% | 103% |
| OIT | 2650% | >9900% |
| HDT | 35% | 51% |
| Hardness | = | = |
| Stiffness (Tensile) | 40% | 58% |
| Tensile resistance | −9% | 5% |
| Breaking strength | 38% | 78% |
| Stiffness (Flexural) | 38% | 26% |
| Flexural resistance | 22% | 80% |

With the incorporation of 30% lignin in PP and PE, the flow index increases significantly (287% for PP and 103% for PE) indicating greater processability of the compositions, when compared to pure polymers. The incorporation of lignin also led to a marked increase in thermo-oxidative resistance, assessed by the induced oxidation time (Oxidative-Induction Time—OIT) and dimensional stability, assessed by the heat deflection temperature (HDT).

With respect to mechanical properties, the incorporation of 30% lignin in PP and PE did not have significant impacts on hardness and tensile strength (measured at the outflow) and led to an increase in (tensile and flexural) stiffness, the breaking strength and the flexural strength.

EXAMPLE 2

Comparative tests of successive extrusions of PP and composites, according to the invention, comprising 30% lignin A (92.5% lignin, pH<7, eucalyptus Kraft lignin) in PP.

Figure 1A:
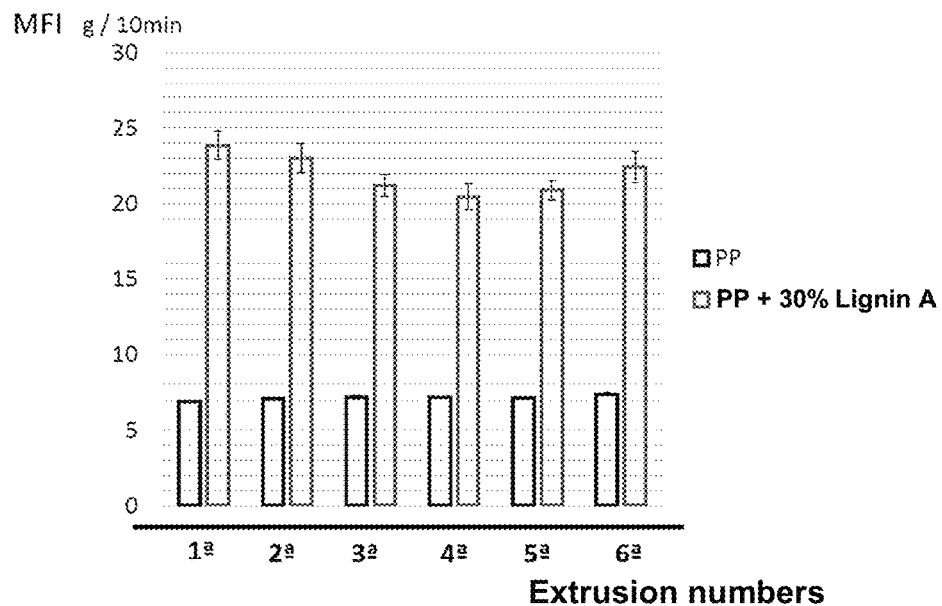
FIGS. 1A, 1B, 1C and 1D—comparative test charts of successive extrusions of PP and composites comprising 30% lignin A (92.5% of lignin, pH<7, eucalyptus Kraft lignin) in PP.
Figure 1B:
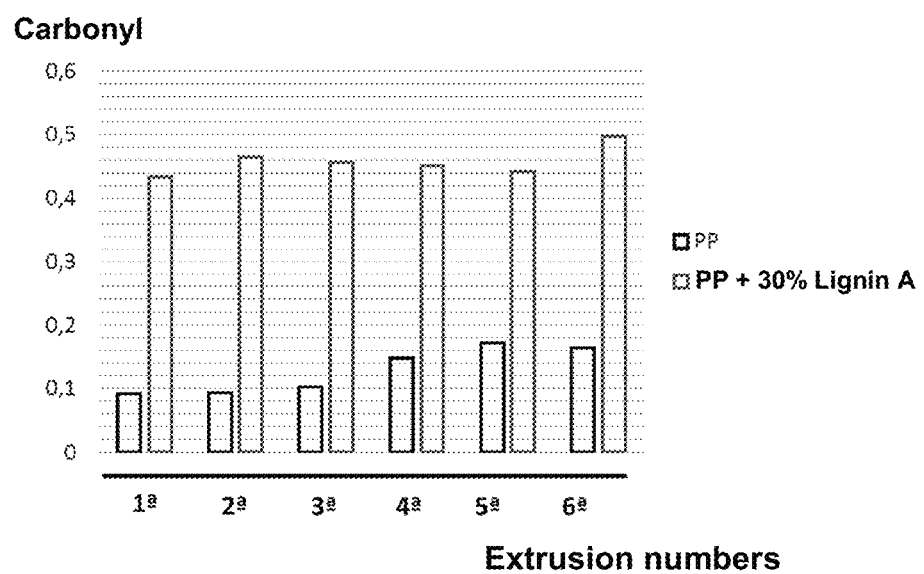
Figure 1C:
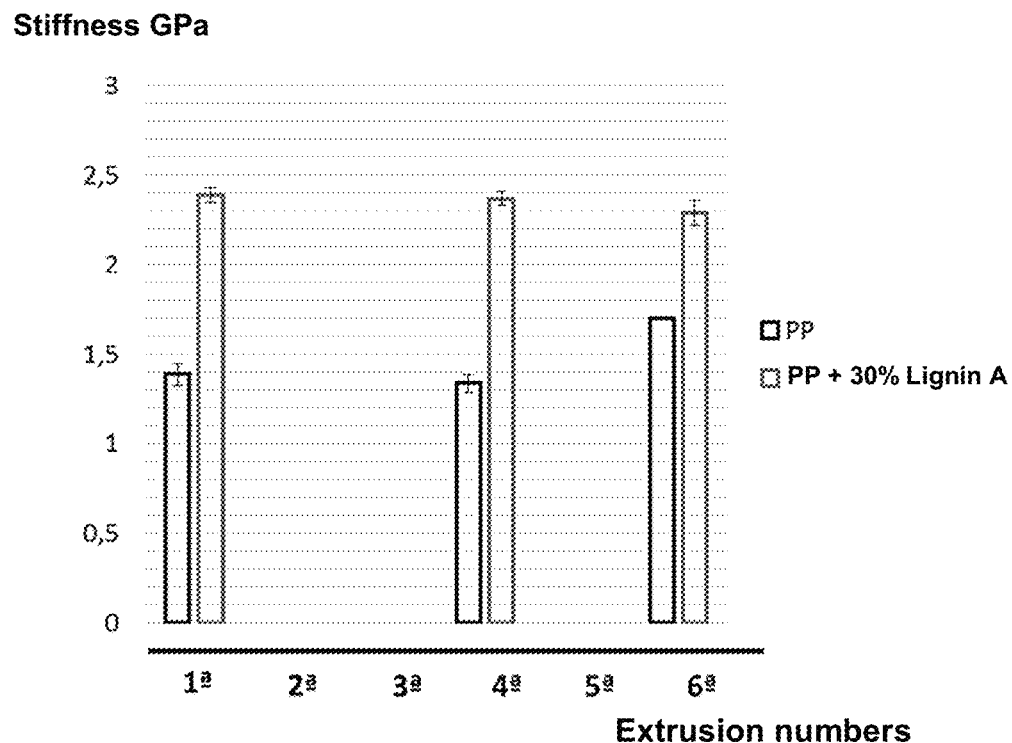
Figure 1D:
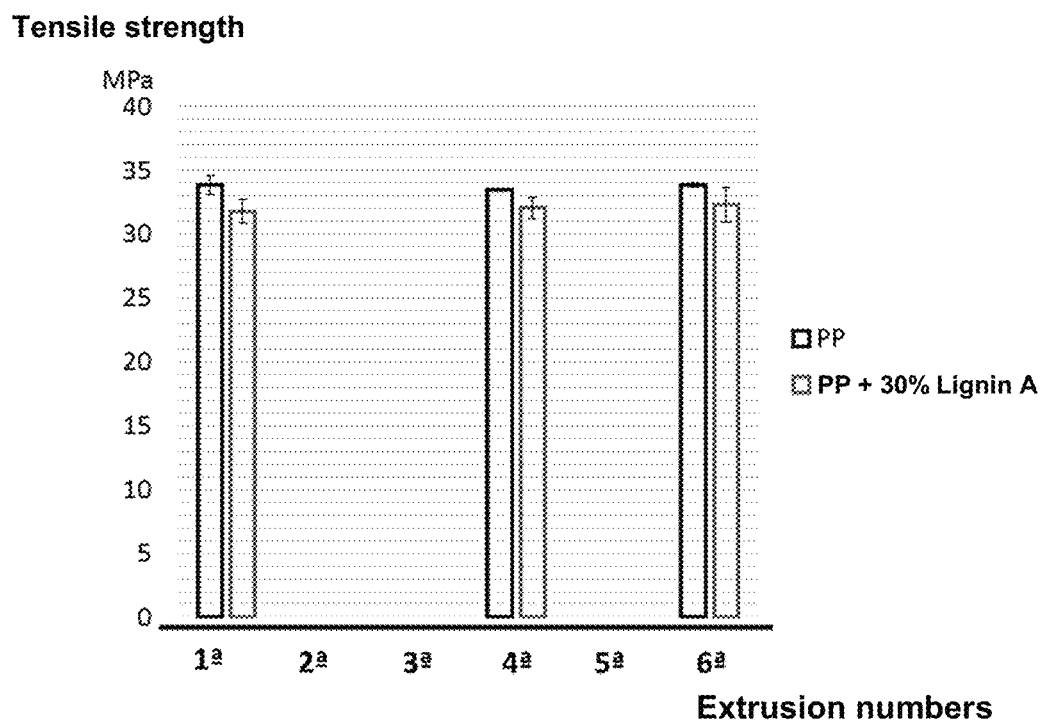

See FIG. 1A, flow index variation; FIG. 1B, carbonyl variation; FIG. 1C, stiffness variation, GPa; FIG. 1D, tensile strength variation, MPa.

It can be seen that throughout successive extrusions the flow index (1A) only oscillates, and no increasing or decreasing trend for that property with reprocessing was observed.

Also, no significant increase in the intensity of the carbonyl group absorption band was observed along the extrusions (1B). Only after 6 extrusion cycles, the composition comprising lignin shows an increase in the intensity of the band under discussion. It is known that the increased intensity of this band is observed in degraded polyolefins. The pure PP, by its turn, presents a clear trend of increased intensity of the carbonyl absorption band from the third extrusion cycle.

The rigidity (1C) and the tensile strength (1D) of the composition comprising lignin did not significantly change with reprocessing.

The results show stability of the composition with reprocessing, indicating potential for the material to be recycled by mechanical processing.

EXAMPLE 3

Evaluation of properties of composites comprising between 10 and 40% lignin A (92.5% lignin, pH<7, eucalyptus Kraft lignin) in PP and PE. The presented values are relative to the properties of the pure polymers.

Figure 2A:
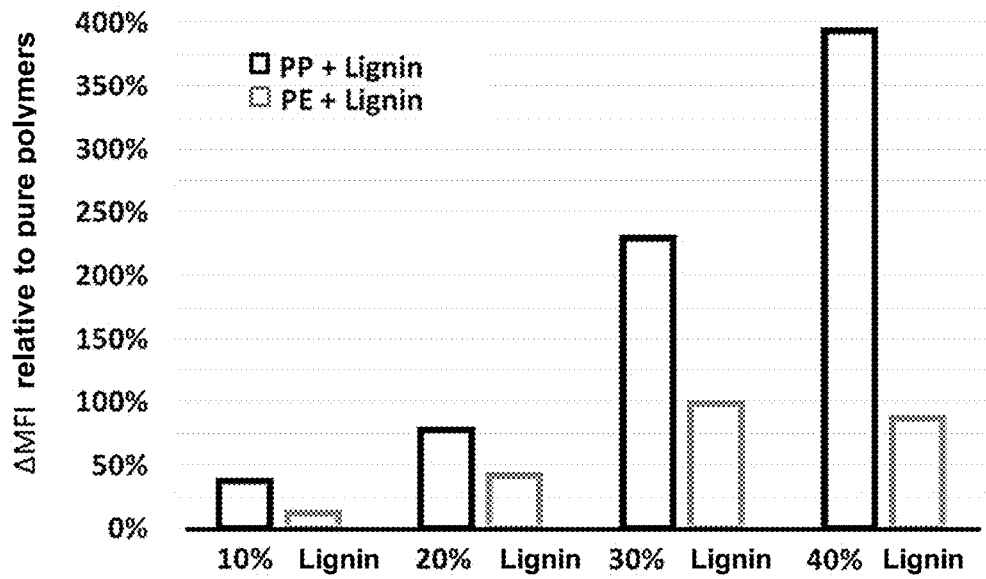
FIGS. 2A, 2B, 2C, 2D, 2E and 2F—evaluation charts with properties of composites comprising between 10 and 40% of lignin A (92.5% of lignin, pH<7, eucalyptus Kraft lignin) in PP and PE, the presented values therein being relative to the properties of pure polymers, FIG. 2A showing the flow index variation.
Figure 2B:
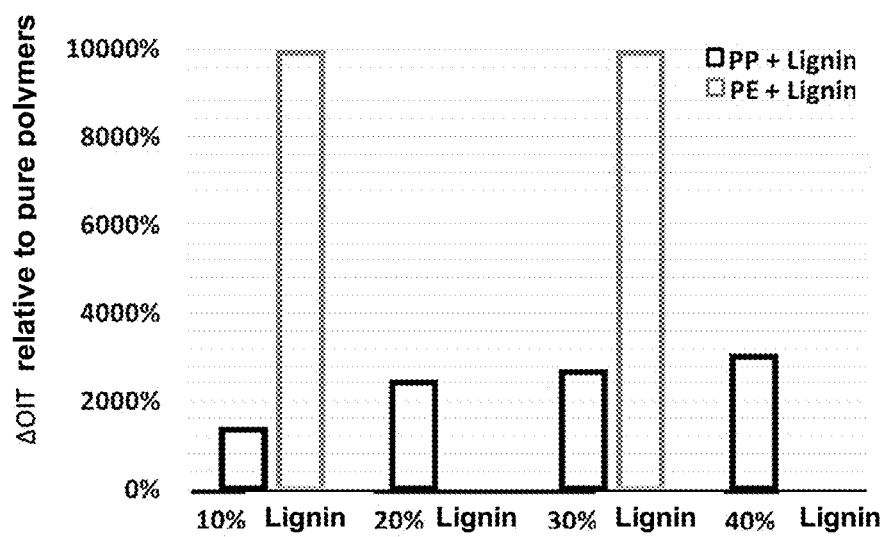
Figure 2C:
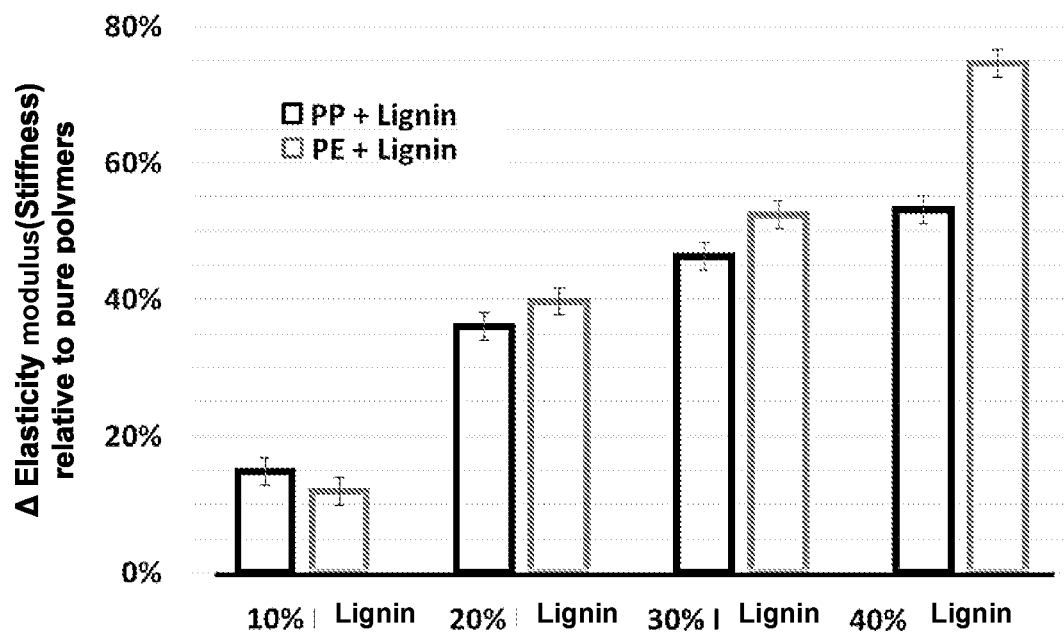
Figure 2D:
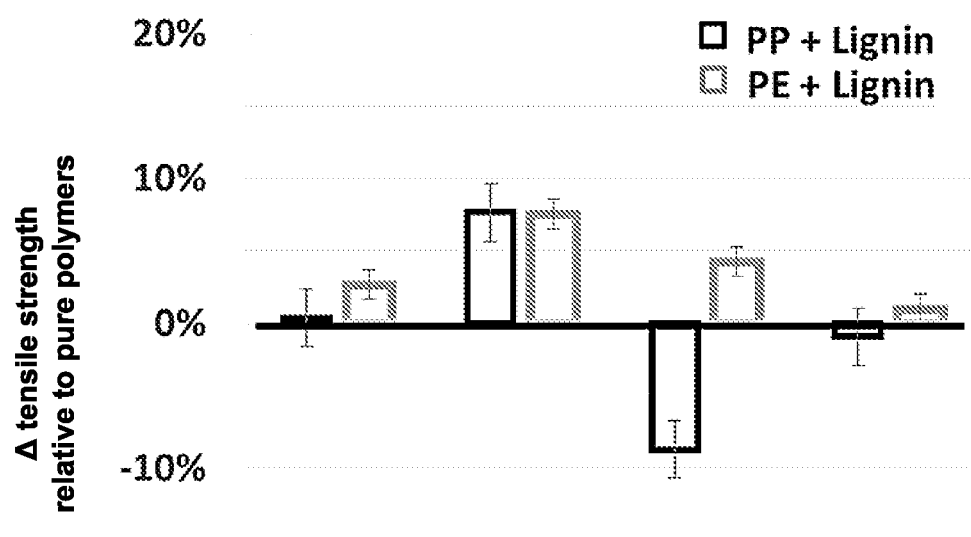
Figure 2E:
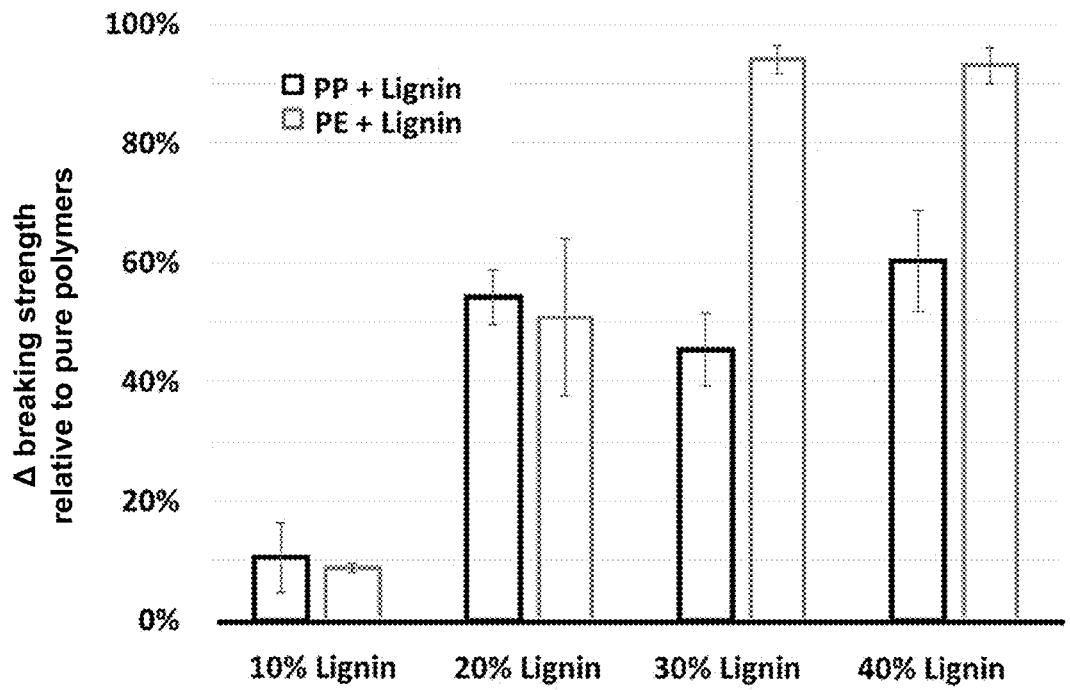
Figure 2F:
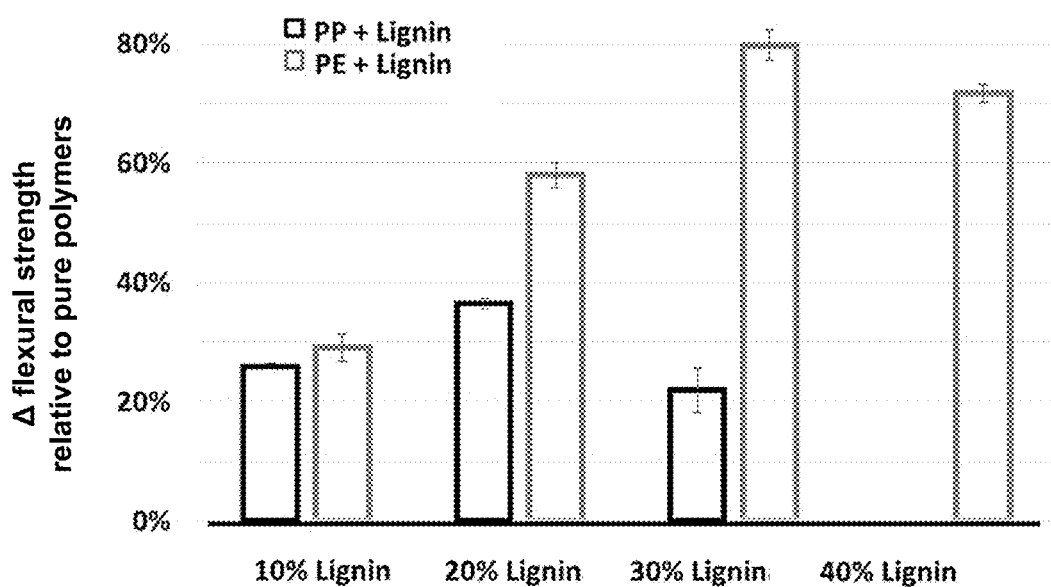

See FIGS. 2A, flow index variation; FIG. 2B, thermo-oxidative resistance variation; FIG. 2C, stiffness variation (elasticity modulus) and FIG. 2D, tensile strength variation; FIG. 2E, breaking strength variation; and FIG. 2F, flexural strength variation.

The samples with different lignin contents follow the behavior observed for samples with 30% lignin: increase in flow index, in thermo-oxidative resistance, stiffness (traction), breaking strength, flexural strength and tensile strength maintenance measured at the outflow point (variations of up to ±10%). With increasing lignin content, increase is observed in the flow index, stiffness (tensile) and breaking strength, for both PP and PE compositions.

EXAMPLE 4

Evaluation of properties of composites comprising 30% lignin A (93.3% lignin, pH<7, eucalyptus Kraft lignin) in recycled PP and PE. The presented values are relative to the properties of the pure polymers. The composition with recycled PE comprises mostly PE derived from industrial scrap and post-consumption recycled PP.

Figure 3A:
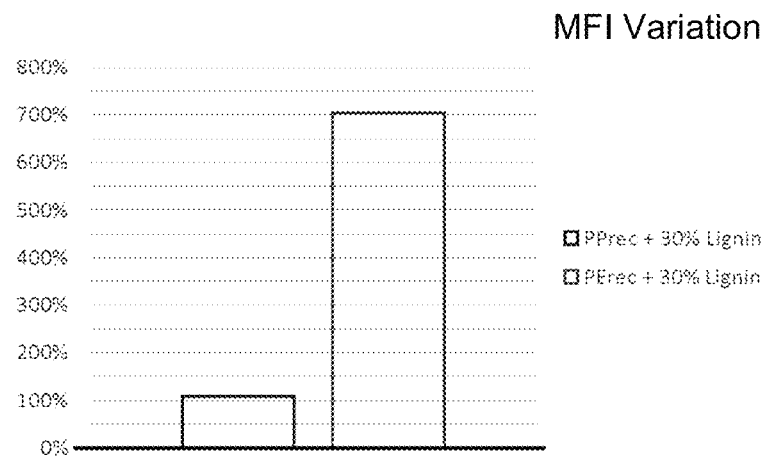
FIGS. 3A, 3B, 3C and 3D—evaluation charts with properties of composites comprising 30% lignin A (93.3% lignin, pH<7, eucalyptus Kraft lignin) in recycled PP or PE, the presented values therein being relative to the properties of pure polymers, where the recycled PE is used in a composition with mostly PE derived from industrial scrap and post-consumption recycled PP.
Figure 3B:
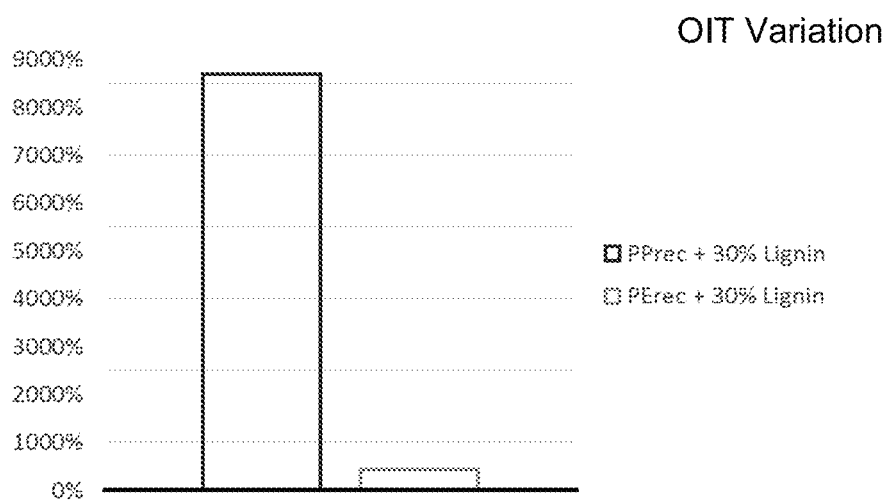
Figure 3C:
Figure 3D:
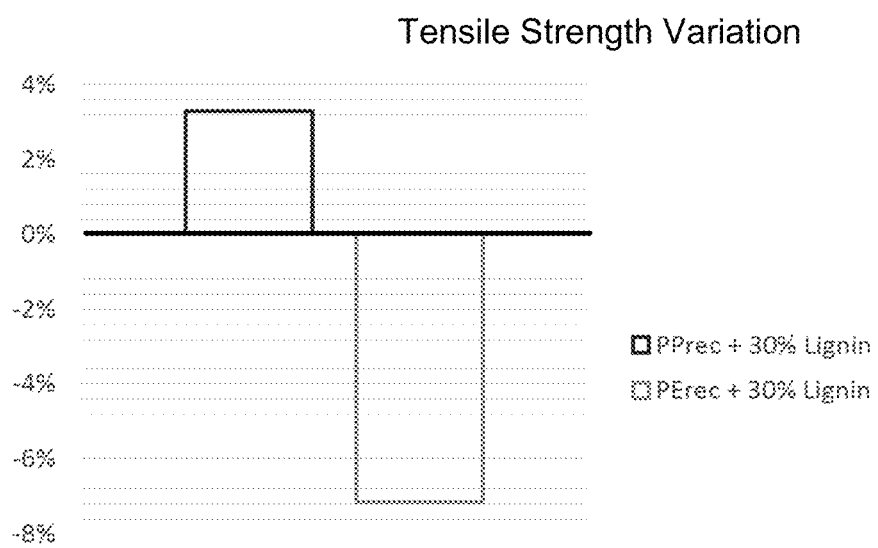

See FIGS. 3A, flow index variation; FIG. 3B, thermo-oxidative resistance variation; FIG. 3C, stiffness variation (elasticity modulus); and FIG. 3D, tensile strength variation.

The compositions with 30% lignin in recycled PP and PE showed the same behavior of the compositions with virgin polymers: increase in flow index, thermo-oxidative resistance, stiffness (tensile) and tensile strength maintenance measured at the outflow (variation less than ±10%).

EXAMPLE 5

Evaluation of properties of composites comprising between 30% of different types of lignin in PP and PE. The presented values are relative to the properties of the pure polymer. The types of lignin tested are identified below:

lignin A: eucalyptus Kraft lignin; pH<7; 92.5 to 93.3 lignin;
lignin A': softwood Kraft lignin; pH<7; 91.9% lignin;
lignin B: eucalyptus Kraft lignin; pH>7; 92.0 lignin;
lignin B': softwood Kraft lignin; pH>7; 82.5% lignin;
Sugar cane lignin: hydrolysis residue from sugar cane biomass; pH<7; 60% lignin.

Figure 4A:
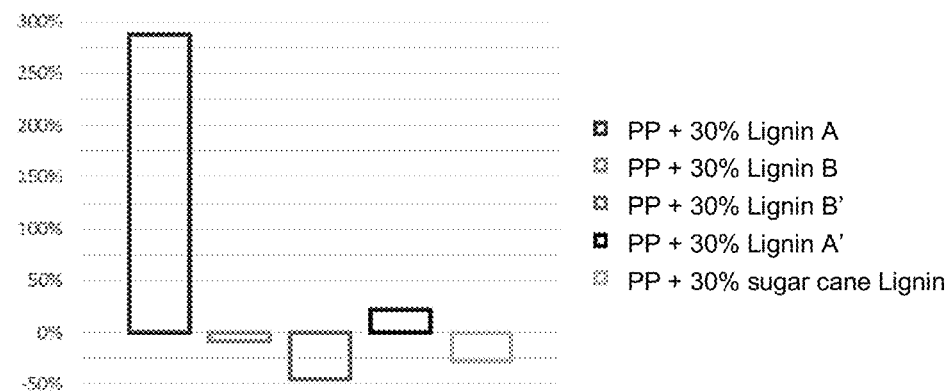
FIGS. 4A, 4B, 4C and 4D—evaluation charts with properties of composites comprising 30% of different types of lignin in PP, the presented values therein being relative to the properties of the pure polymer.
Figure 4B:
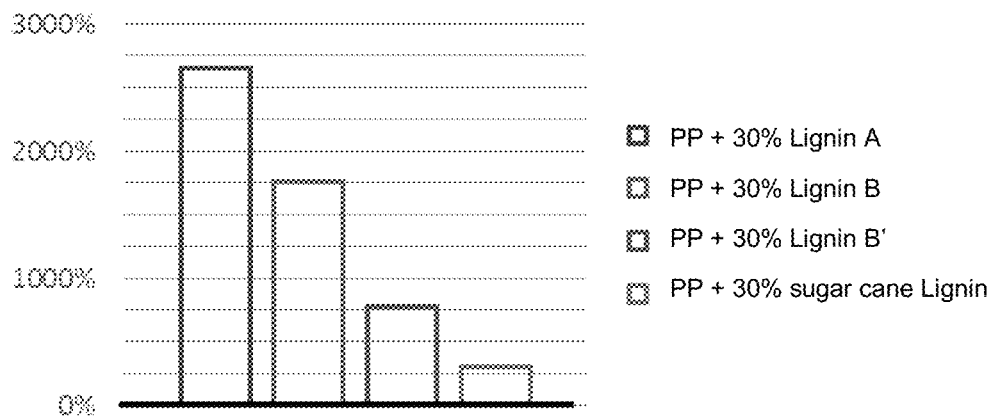
Figure 4C:
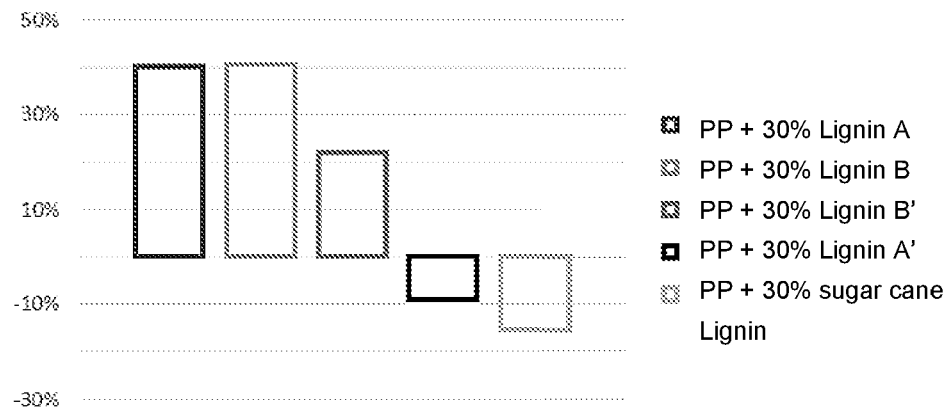
Figure 4D:
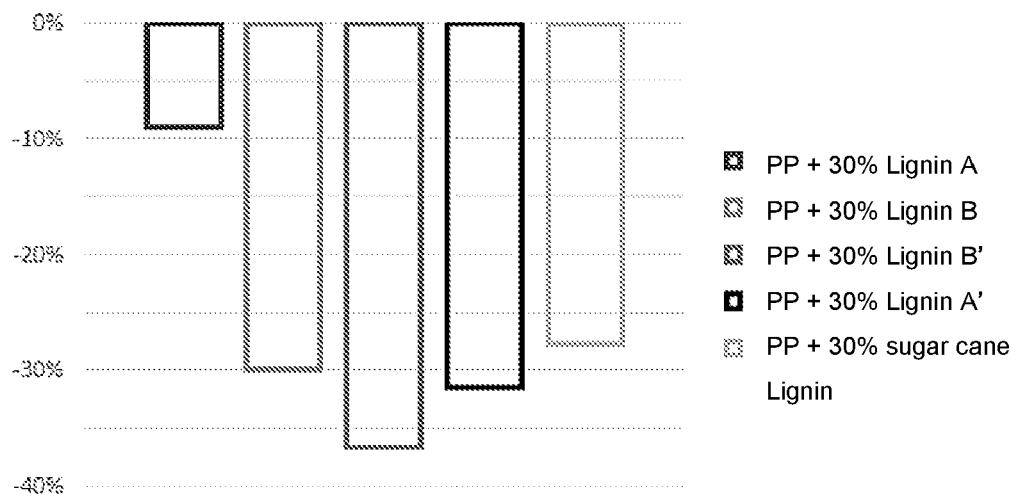
Figure 4A:
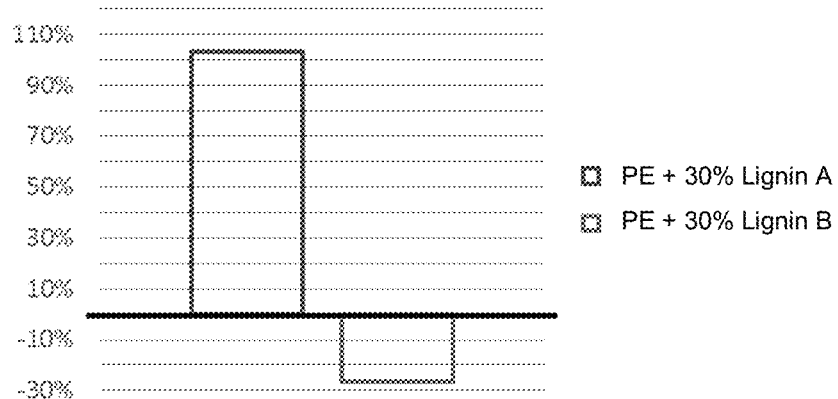
Figure 4B:
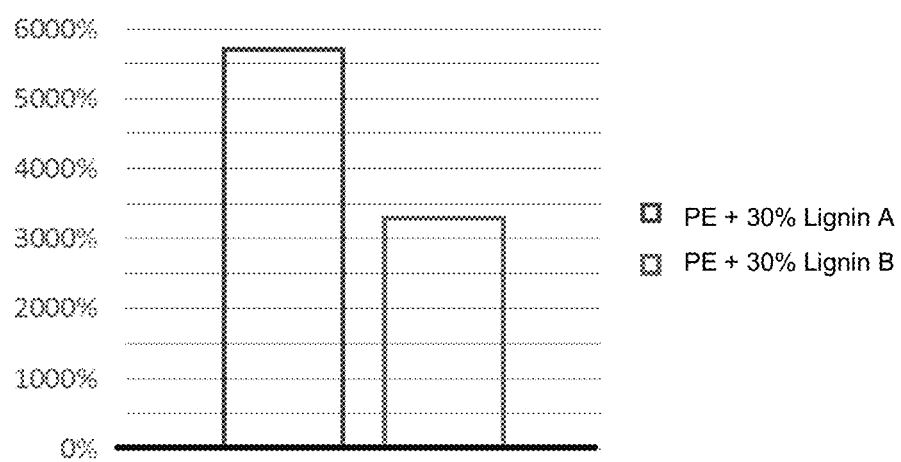
Figure 4C:
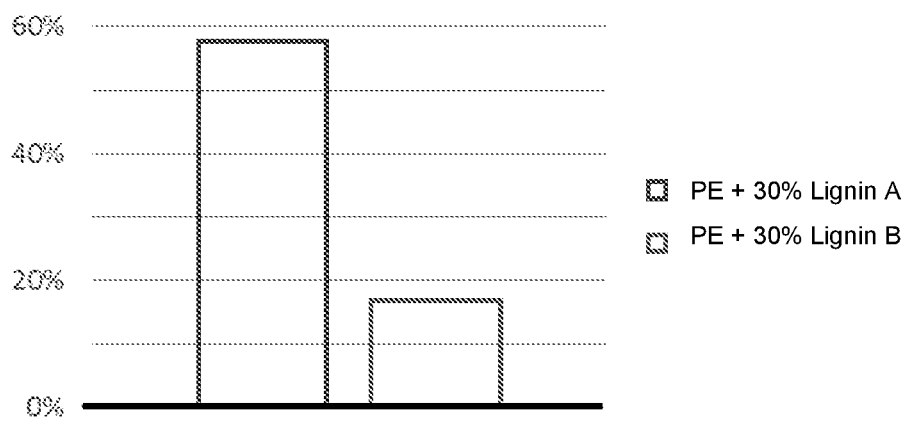
Figure 4D:
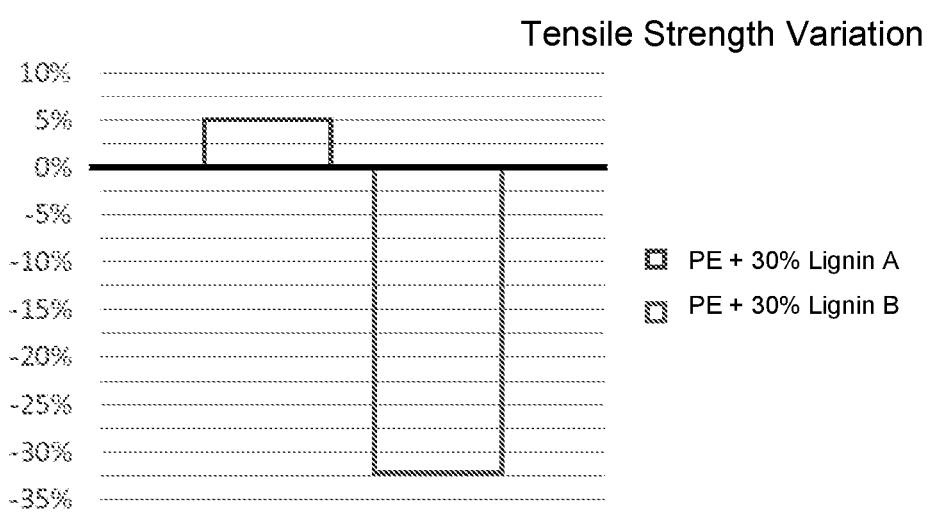

See the figures related to the tests with PP: 4A, flow index variation; FIG. 4B, thermo-oxidative resistance variation; FIG. 4C, stiffness variation (elasticity modulus); FIG. 4D, tensile strength variation; see the figures related to tests with PE: 4A', flow index variation; FIG. 4B', thermo-oxidative resistance variation; FIG. 4C', stiffness variation (elasticity modulus); and FIG. 4D', tensile strength variation.

From the types of lignin tested, only the lignin A (eucalyptus Kraft lignin with pH<7) presents a significant increase in flow index and thermo-oxidative resistance, with increased stiffness (tensile) and tensile strength maintenance (variations of less than ±10% in relation to the pure polymer).

EXAMPLE 6

Evaluation of properties of composites comprising 30% lignin A and 3% of compatibilizer in PP and PE to improve interface properties and the visual aspect of the objects. The presented values are relative to the properties of the pure polymer. For PP, compatibilizer Polybond® 7200 was used, a polypropylene homopolymer graphitized with maleic anhydride, provided by the company Addivant. For PE, compatibilizer Polybond® 3349 was used, a low density linear polyethylene graphitized with maleic anhydride, provided by the company Addivant.

Figure 5A:
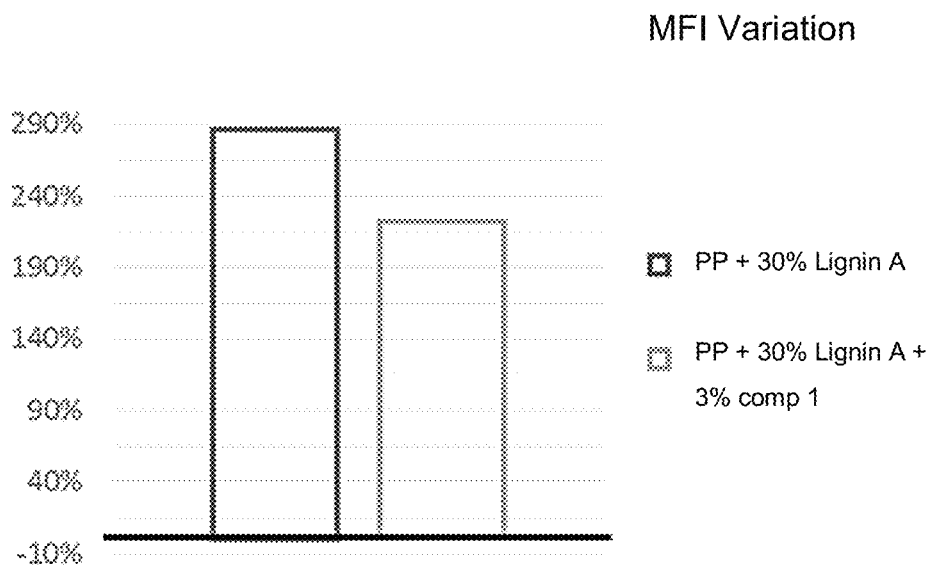
FIGS. 5A, 5B and 5C—evaluation charts with properties of composites comprising between 30% lignin A and 3% of compatibilizer in PP, in order to improve the interface properties and the visual aspect of manufactured objects, the presented values being relative to the properties of the pure polymer; the compatibilizer was Polybond® 7200, a polypropylene homopolymer graphitized with maleic anhydride, provided by the company Addivant.
Figure 5A:
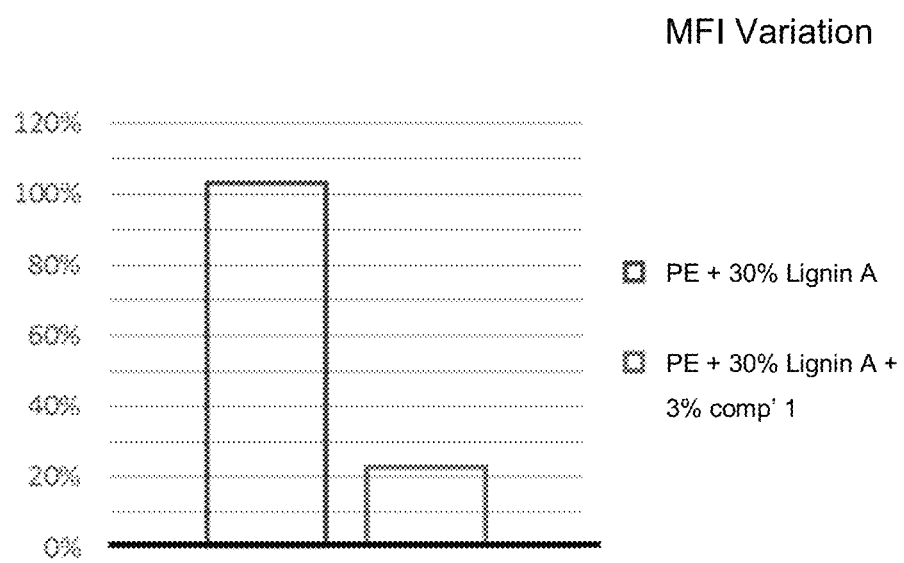
Figure 5B:
Figure 5B:
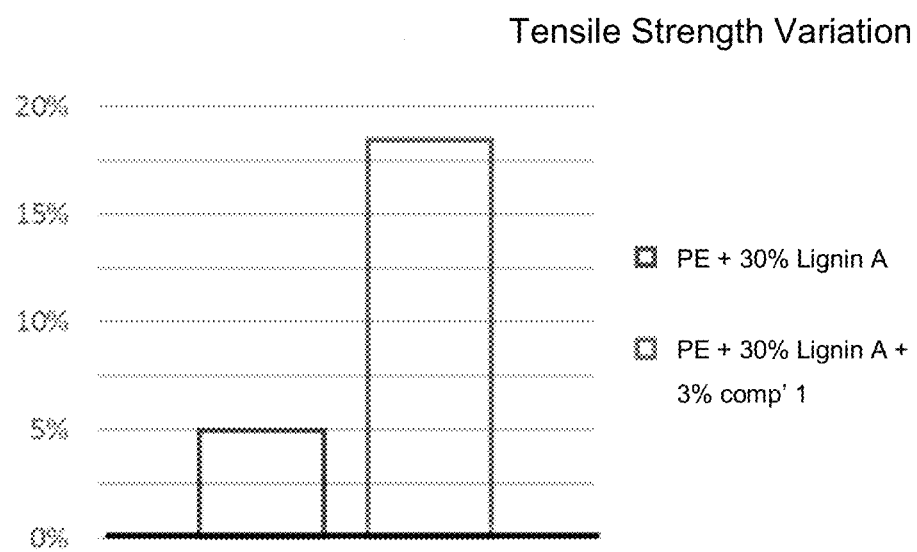
Figure 5C:
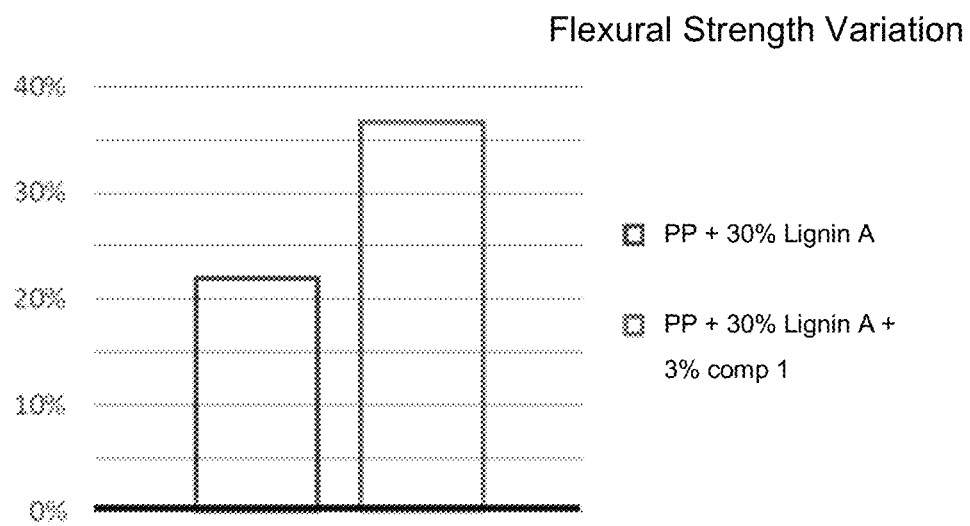
Figure 5C:
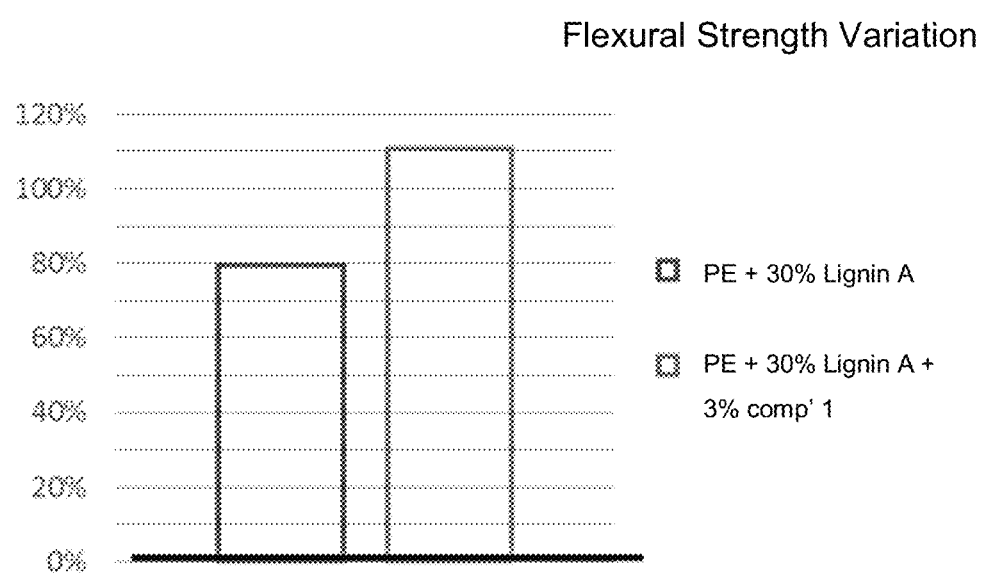

See FIGS. 5A and 5A', flow index variation; FIGS. 5B and 5B', tensile strength variation; FIGS. 5C and 5C', flexural strength variation.

Besides improving the visual aspect of the molded objects, the use of a compatibilizer led to an increase in flexural strength of the lignin compositions with PP and PE, compared to the pure polymers. It was also observed, in the lignin composition with PE, an increase in the tensile strength measured at the outflow.

EXAMPLE 7

Evaluation of the effect of addition of lignin A (93.3% lignin, pH<7, eucalyptus Kraft lignin) on composite properties, comprising 10% talc in PP. The presented values are relative to the properties of the pure polymer.

Figure 6A:
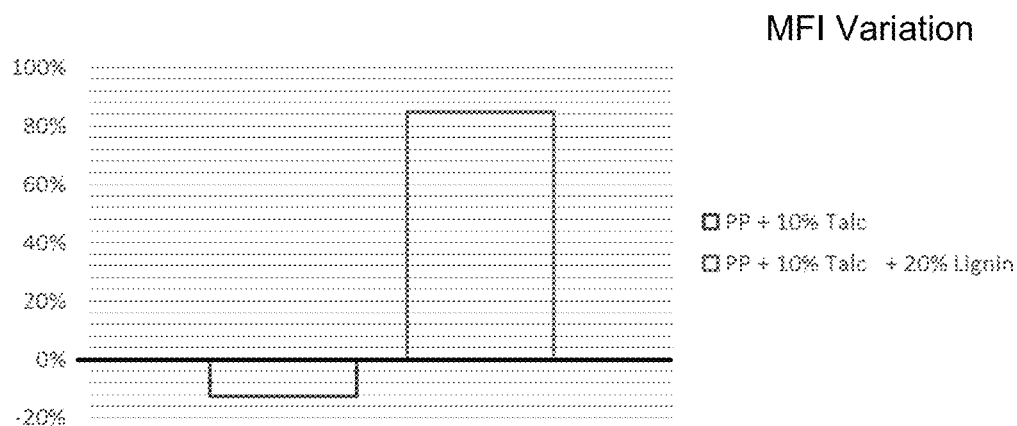
FIGS. 6A, 6B and 6C—evaluation charts with the effect of addition of lignin A (93.3% lignin, pH<7, eucalyptus Kraft lignin) in the properties of composites, comprising 10% of talc in PP, the presented values therein being relative to the properties of the pure polymer.
Figure 6B:
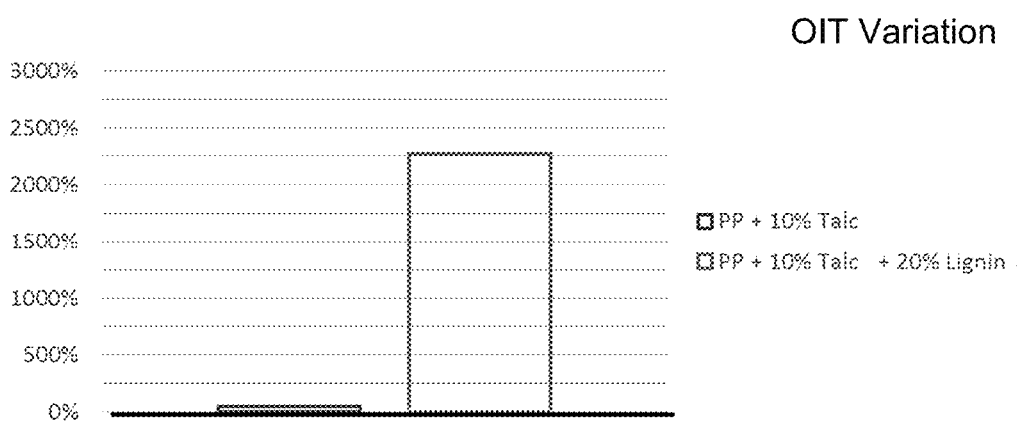
Figure 6C:
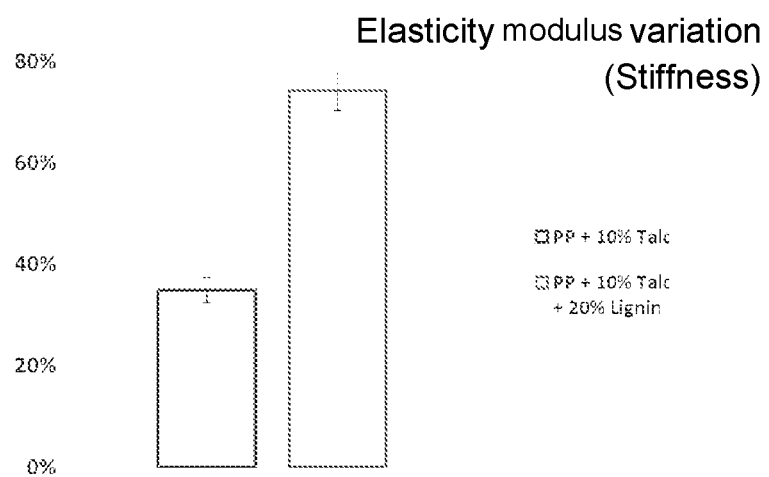

See FIGS. 6A, flow index variation; FIG. 6B, thermo-oxidative resistance variation; and FIG. 6C, elasticity modulus variation (stiffness).

With the incorporation of 20% lignin in PP with 10% talc, the flow index, thermo-oxidative resistance and elasticity modulus (stiffness) radically increase.

Analytic Methodologies of the Evaluated Parameters
Determination of Lignin pH
1. Weigh 5 g of lignin in a 100 mL beaker;
2. Add 45 g of distilled water;
3. Homogenize the dispersion with a glass rod;
4. Insert an electrode to measure the pH, waiting for the stabilization of the reading.

Stiffness, Tensile Strength Measured at the Outflow and Breaking Strength

The stiffness, tensile strength measured at the outflow and the breaking strength were measured in accordance with ASTM D638:2014: "Standard Test Method for Tensile Properties of Plastics" using an Instron equipment, 5569 model, under the following conditions: temperature at 23° C., 50% relative humidity, 5.0 KN load cell, test speed of 5.0 and 50.0 mm/min.

Flow Index

The flow index for PE and compositions therewith was measured according to ASTM D1238:13, "Standard Test Method for Melt Flow Rates of Thermoplastics by Extrusion Plastometer". The assays were carried out at 190° C. with applied load of 2.16 Kg.

The flow index for PP and compositions therewith was measured according to ASTM D1238:13, "Standard Test Method for Melt Flow Rates of Thermoplastics by Extrusion Plastometer". The assays were carried out at 230° C. with applied load of 2.16 Kg.

Stiffness and Flexural Strength

The stiffness and flexural strength were measured according to ASTM D790:2010: "Standard Test Methods for Flexural Properties of Unreinforced and Reinforced Plastics and Electrical Insulating Materials" using an Instron equipment, model 5569, under the following conditions: temperature at 23° C., 50% relative humidity, 50 KN load cell, distance between supports (span) of 50 mm and test speed of 1.2 mm/min.

Heat Deflection Temperature (HDT)

The heat deflection temperature was measured according to ASTM D648:2007: "Standard Test Method for Deflection Temperature of Plastics Under Flexural Load in the Edgewise Position" using a CEAST equipment, model HDT 6 VICAT P/N 6921, under the following conditions: 1.82 of Mpa load, heating rate of 2.0±0.2° C./min, silicon oil as heat transfer medium, specimen in the upright position and distance between supports (span) of 100 mm.

Thermo-oxidative resistance (OIT)—The analyses were carried out according to ASTM D3895:2014—"Standard Test Method for Oxidative-Induction Time of Polyolefins by Differential Scanning calorimetry".

The test measures the oxidative induction time, that is the time the material takes to start the oxidation process, at a given temperature, when subjected to an oxidizing atmosphere ($O_2$).

The assay occurs under the following parameters:

| Step | Temperature (° C.) | Rate (° C./min) | Gas | Gas flow rate (mL/min) |
|---|---|---|---|---|
| Heating | 25 to 200 | 20 | $N_2$ | 50 |
| Isotherm | 200 | — | $O_2$ | 50 |
| Sample mass (mg) | | 6 ± 1 | | |
| Equipment | DSC, Shimadzu, model DSC-60 | | | |

Carbonyl groups (FTIR)—The objective of this analysis is to verify the material degradation index after successive processing cycles by sample extrusion. To obtain the degradation index, the absorption bands of 2720 cm-1 were monitored, which is considered the reference band characteristic for polypropylene and the absorption band around 1720-1730 $cm^{-1}$, of the carbonyl group, characteristic of polyolefin degradation. To obtain the degradation index, a ratio between the intensities of the carbonyl and reference bands was set forth. The analyses were carried out using a Shimadzu spectrophotometer, model IRPrestige-21, each reading being carried out in 32 repetitions from 4000 to 400 $cm^{-1}$. The samples were analyzed as films formed from the hot solubilization of polyolefins, or from their compositions in decalin.

Determination of lignin purity—modified Klason method (TAPPI T 222 om-11 methodology: Acid-insoluble lignin in wood and pulp).

The total lignin content is calculated from the following formula:

total lignin content=% Klason lignin free from ashes+% soluble lignin

Obtaining the % Klason ash-free lignin is as given below.

Measuring the solid content of the lignin sample dried at 105° C. If the solid content is below 90%, the sample must be dried at a maximum temperature of 50° C. before the analysis;

Weighing, in duplicate, about 175 mg of dry sample (A mass) in a 10 mL test tube with a screw cap;

Adding 1.5 mL of 72% (mass %) sulphuric acid to the sample A;

Stirring the contents of the test tube to help sample dissolution;

Keeping the test tube in a water bath at 30° C. for 1 hour and under magnetic stirring;

Transferring the contents of the test tube to a 100 mL Erlenmeyer flask;

Adding about 42 mL of demineralized water in small portions to wash the test tube, removing all material deposited on the tube wall and transferring the wash water to the Erlenmeyer flask;

Keeping the Erlenmeyer flask (properly stoppered) in an oil bath at 102±2° C. for 3 hours;

After 3 hours of hydrolysis, cooling the Erlenmeyer flask to ambient temperature in a water bath;

Filtering the contents of the Erlenmeyer flask using a sintered glass crucible, previously dried and weighed (B mass);

Rinsing the Erlenmeyer flask with 75 mL of demineralized water passing the wash water in the crucible;

Transferring the filtrate into a 200 mL volumetric flask;

Washing the Buchner flask used in the filtration with 25 mL demineralized water, transferring the washing water to the volumetric flask and completing the volume with demineralized water. The filtrate is used for determining the content of soluble lignin;

Drying the sintered glass filter with the filtration residue for at least 12 h at 105° C.;

After drying, maintaining the sintered glass crucible in a desiccator for 5 to 10 min and then weighing it with the residue (mass C);

Keeping the crucible with the dry residue in a kiln at 550° C. for 2 to 3 hours;

Cooling the crucible in a desiccator and then weighing the crucible with the ashes (mass D).

Calculating the % of Klason lignin without considering the ash content:

Klason lignin content(not adjusted)=$((C-B)/(A \times E/100)) \times 100$

Calculating the % of ashes:

Ash content=$((D-B)/(C-B)) \times 10$ wherein:
A=Initial mass sample (g)
B=mass of the sintered glass crucible (g)
C=mass of the sintered glass crucible+mass of the residue after drying (g)

D=mass of the sintered glass crucible+mass of residual ash (g)
E=sample solids content (%)

Calculating the % ash-free Klason lignin:

Content of ash-free Klason lignin=(Klason lignin content not adjusted)×(100−% ashes)/100

The determination of % soluble lignin, by UV spectroscopy, is as follows.

Diluting 2.0 mL of the filtered solution (from the 200 mL volumetric flask) with demineralized water (1× to 20× dilution is usually required)

Measuring the absorbance of demineralized water in a cell with 1 cm optical path, at 205 nm as blank (Ab measurement)

Measuring the absorbance of the filtered solution in the same cell and under the same conditions of the blank (Aa measurement)

The value "Aa−Ab" must be between 0.2 and 0.7 ABS. If it is not the case, the filtrate must be diluted until the difference "Aa−Ab" is within the recommended range.

Calculating the soluble lignin content with the following formula:

$$\% \text{ soluble lignin} = \frac{(Aa - Ab) * d * Vfilt * 100}{Easl * M * \frac{Ts}{100} * CP}$$

wherein
Aa=absorbance of the diluted sample
Ab=blank absorbance (demineralized water)
d=dilution factor (1/xx)
Vfilt=total volume of the filtrate in L (0.2 L)
Easl=extinction coefficient of lignin in L cm/g (110 L cm/g)
M=initial mass of the sample in grams
Ts=total solids content in %
CP=optical path of the cell (1 cm)

Based on the information presented herein, a person skilled in the art will readily know how to assess the advantages of the invention, as well as to propose variations and alternative embodiments not expressly described, but that are equivalent to the invention in terms of function and result, without departing from the scope of this patent as defined in the annexed claims.

The invention claimed is:

1. An olefinic polymer composition comprising at least one polyolefin and a eucalyptus lignin with a pH 7 from 3 to 6, wherein the polyolefin consists of polypropylene, wherein the lignin content is from 5% to 30% of the total weight of the composition, wherein the olefinic polymer composition has increased tensile stiffness and melt flow index (MFI) when compared to a pure polypropylene, and wherein the lignin is Kraft lignin.

2. The olefinic polymer composition according to claim 1, wherein the lignin has a nearly equitable ratio between fragments originating from trans-coniferyl and trans-sinapyl alcohols, with a portion of fragments from trans-p-coumaryl alcohol.

3. The olefinic polymer composition according to claim 1, wherein the purity of the lignin is greater than or equal to 85%.

4. The olefinic polymer composition according to claim 1, wherein the lignin content is from 10% to 30% of the total weight of the composition.

5. The olefinic polymer composition according to claim 1, wherein the polyolefin is a homopolymeric polypropylene.

6. The olefinic polymer composition according to claim 1, further comprising one or more additional polymers selected from the group consisting of polyamides, polyesters, polyalkylene glycols, polyacrylates, polymethylmethacrylate, and combinations thereof.

7. The olefinic polymer composition according to claim 1, further comprising one or more additives selected from the group consisting of anti-oxidants, anti-UV agents, lubricants, plasticizers, stabilizers, compatibilizers, impact modifiers, pigments, dyes, antiflame agents and colorants.

8. The olefinic polymer composition according to claim 1, further comprising fillers and/or reinforcements selected from the group consisting of talc, calcium carbonate, kaolin, mica, at least one clay and fibers.

9. The olefinic polymer composition according to claim 1, wherein the composition is a concentrate.

10. The olefinic polymer composition according to claim 1, wherein the composition is of reuse.

11. An object obtained from an olefin thermoplastic composition according to claim 1.

12. The olefinic polymer composition according to claim 9, wherein the concentrate is a master batch.

13. The olefinic polymer composition according to claim 1 wherein the tensile stiffness is measured on the basis of tensile strength and breaking strength in accordance with ASTM D638:2014.

14. The olefinic polymer composition according to claim 1 wherein the tensile stiffness is measured on the basis of Elastic Modulus (GPa).

15. The olefinic polymer composition according to claim 1 wherein the melt flow index is measured in accordance with ASTM D1238:13.

16. An olefinic polymer composition comprising at least one polyolefin and a eucalyptus lignin with a pH from 3 to 6, wherein the polyolefin consists of polyethylene, wherein the lignin content is 30% of the total weight of the composition, wherein the olefinic polymer composition has increased tensile stiffness and melt flow index (MFI) when compared to a pure polyethylene, and wherein the lignin is Kraft lignin.

* * * * *

UNITED STATES PATENT AND TRADEMARK OFFICE
CERTIFICATE OF CORRECTION

| | | |
|---|---|---|
| PATENT NO. | : 11,555,103 B2 | |
| APPLICATION NO. | : 16/324372 | |
| DATED | : January 17, 2023 | |
| INVENTOR(S) | : Torrezan et al. | |

It is certified that error appears in the above-identified patent and that said Letters Patent is hereby corrected as shown below:

In the Claims

Column 9, Lines 47-54:
Please change:
"1. An olefinic polymer composition comprising at least one polyolefin and a eucalyptus lignin with a pH 7 from 3 to 6, wherein the polyolefin consists of polypropylene, wherein the lignin content is from 5% to 30% of the total weight of the composition, wherein the olefinic polymer composition has increased tensile stiffness and melt flow index (MFI) when compared to a pure polypropylene, and wherein the lignin is Kraft lignin."
To:
- 1. An olefinic polymer composition comprising at least one polyolefin and a eucalyptus lignin with a pH from 3 to 6, wherein the polyolefin consists of polypropylene, wherein the lignin content is from 5% to 30% of the total weight of the composition, wherein the olefinic polymer composition has increased tensile stiffness and melt flow index (MFI) when compared to a pure polypropylene, and wherein the lignin is Kraft lignin. -

Signed and Sealed this
Ninth Day of May, 2023

Katherine Kelly Vidal
*Director of the United States Patent and Trademark Office*